(12) United States Patent
Liu

(10) Patent No.: US 11,210,302 B2
(45) Date of Patent: *Dec. 28, 2021

(54) METHODS, SYSTEMS, AND MEDIA FOR DISPLAYING INFORMATION RELATED TO DISPLAYED CONTENT UPON DETECTION OF USER ATTENTION

(71) Applicant: Google LLC, Mountain View, CA (US)

(72) Inventor: Eric H. Liu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 16/277,085

(22) Filed: Feb. 15, 2019

(65) Prior Publication Data

US 2019/0251090 A1 Aug. 15, 2019

Related U.S. Application Data

(63) Continuation of application No. 15/843,483, filed on Dec. 15, 2017, now Pat. No. 10,210,219, which is a continuation of application No. 13/830,621, filed on Mar. 14, 2013, now Pat. No. 9,881,058.

(51) Int. Cl.
*G06F 16/20* (2019.01)
*G06F 16/2457* (2019.01)

(52) U.S. Cl.
CPC .............................. *G06F 16/24578* (2019.01)

(58) Field of Classification Search
CPC ............................................... G06F 16/24578
See application file for complete search history.

(56) References Cited

U.S. PATENT DOCUMENTS

| 6,061,659 | A | 5/2000 | Murray |
| 8,468,565 | B2 | 6/2013 | Thomas et al. |
| 9,164,582 | B2 | 10/2015 | Seki |
| 9,423,994 | B2 | 8/2016 | Suresh et al. |
| 9,575,615 | B1 * | 2/2017 | Nicholls ............... G06F 3/0346 |

(Continued)

FOREIGN PATENT DOCUMENTS

WO WO 9967904 12/1999

OTHER PUBLICATIONS

International Search Report and Written Opinion of the International Searching Authority dated Oct. 2, 2015 in International Patent Application No. PCT/US2015/040063.

(Continued)

*Primary Examiner* — Tarek Chbouki
(74) *Attorney, Agent, or Firm* — Byrne Poh LLP

(57) ABSTRACT

Methods, systems, and media for displaying information related to displayed content upon detection of user attention are provided. In some implementations, a method for presenting information to a user is provided, the method comprising: detecting a presence of a user; retrieving content and associated content metadata; causing the content to be presented to the user in response to detecting the presence of the user; detecting a user action indicative of user attention to at least a portion of the content presented to the user; and in response to detecting the user action, causing information to be presented to the user, wherein the information presented to the user corresponds to the content metadata associated with the portion of the content.

23 Claims, 10 Drawing Sheets

(56) References Cited

U.S. PATENT DOCUMENTS

| | | | |
|---|---|---|---|
| 9,606,621 B2 | 3/2017 | Lashina et al. | |
| 2002/0008626 A1 | 1/2002 | Waters et al. | |
| 2006/0020513 A1 | 1/2006 | Nagano et al. | |
| 2006/0195461 A1 | 8/2006 | Lo et al. | |
| 2007/0061851 A1 | 3/2007 | Deshpande et al. | |
| 2007/0204223 A1 | 8/2007 | Bartels et al. | |
| 2007/0214118 A1 | 9/2007 | Schoen et al. | |
| 2007/0255690 A1 | 11/2007 | Chang et al. | |
| 2007/0266323 A1 | 11/2007 | Dooley et al. | |
| 2008/0015942 A1 | 1/2008 | Harper et al. | |
| 2008/0215416 A1 | 9/2008 | Ismalon | |
| 2009/0112708 A1 | 4/2009 | Barhydt et al. | |
| 2009/0125321 A1 | 5/2009 | Charlebois et al. | |
| 2009/0131080 A1 | 5/2009 | Nadler et al. | |
| 2009/0164450 A1 | 6/2009 | Martinez et al. | |
| 2009/0174717 A1 | 7/2009 | Salisbury et al. | |
| 2009/0177528 A1 | 7/2009 | Wu et al. | |
| 2009/0177601 A1 | 7/2009 | Huang et al. | |
| 2009/0262257 A1 | 10/2009 | Baurmann et al. | |
| 2010/0013925 A1 | 1/2010 | Fowler et al. | |
| 2010/0060722 A1 | 3/2010 | Bell | |
| 2010/0161409 A1 | 6/2010 | Ryu et al. | |
| 2010/0299199 A1 | 11/2010 | Kang | |
| 2010/0302145 A1 | 12/2010 | Langridge et al. | |
| 2010/0306249 A1 | 12/2010 | Hill et al. | |
| 2011/0131241 A1 | 6/2011 | Petrou et al. | |
| 2011/0271236 A1 | 11/2011 | Jain | |
| 2011/0296163 A1 | 12/2011 | Abernethy et al. | |
| 2012/0151055 A1 | 6/2012 | Kansal et al. | |
| 2013/0046612 A1 | 2/2013 | Prihodko et al. | |
| 2013/0069978 A1* | 3/2013 | Tanaka | G06Q 30/0251 345/619 |
| 2013/0091515 A1 | 4/2013 | Sakata et al. | |
| 2013/0144720 A1 | 6/2013 | Hari et al. | |
| 2013/0151339 A1 | 6/2013 | Kim et al. | |
| 2013/0194177 A1 | 8/2013 | Sakata | |
| 2013/0212065 A1 | 8/2013 | Rahnama | |
| 2013/0307764 A1 | 11/2013 | Denker et al. | |
| 2014/0047464 A1 | 2/2014 | Lev et al. | |
| 2014/0089097 A1 | 3/2014 | Byun et al. | |
| 2014/0108309 A1 | 4/2014 | Frank et al. | |
| 2014/0156342 A1 | 6/2014 | Chiu | |
| 2014/0195918 A1* | 7/2014 | Friedlander | G06F 3/0485 715/727 |
| 2014/0258880 A1 | 9/2014 | Holm et al. | |
| 2014/0317646 A1 | 10/2014 | de la Garza et al. | |
| 2014/0327630 A1 | 11/2014 | Burr et al. | |
| 2014/0365336 A1 | 12/2014 | Hurewitz | |
| 2015/0358594 A1 | 12/2015 | Marshall et al. | |

OTHER PUBLICATIONS

Notice of Allowance dated Sep. 26, 2017 in U.S. Appl. No. 13/830,621.
Notice of Allowance dated Oct. 3, 2018 in U.S. Appl. No. 15/843,483.
Office Action dated Feb. 23, 2017 in U.S. Appl. No. 13/830,621.
Office Action dated Mar. 7, 2019 in U.S. Appl. No. 14/327,902.
Office Action dated Mar. 8, 2018 in U.S. Appl. No. 15/843,483.
Office Action dated Apr. 5, 2018 in U.S. Appl. No. 14/327,902.
Office Action dated Jun. 5, 2015 in U.S. Appl. No. 13/830,621.
Office Action dated Jun. 29, 2016 in U.S. Appl. No. 13/830,621.
Office Action dated Jul. 12, 2017 in U.S. Appl. No. 14/327,902.
Office Action dated Jul. 26, 2017 in U.S. Appl. No. 13/830,621.
Office Action dated Oct. 26, 2018 in U.S. Appl. No. 14/327,902.
Office Action dated Dec. 17, 2015 in U.S. Appl. No. 13/830,621.
Office Action dated Dec. 29, 2016 in U.S. Appl. No. 13/830,621.
Office Action dated Mar. 5, 2020 in U.S. Appl. No. 14/327,902.
Office Action dated Aug. 25, 2020 in U.S. Appl. No. 14/327,902.
Office Action dated Sep. 19, 2019 in U.S. Appl. No. 14/327,902.

* cited by examiner

METHODS, SYSTEMS, AND MEDIA FOR DISPLAYING INFORMATION RELATED TO DISPLAYED CONTENT UPON DETECTION OF USER ATTENTION

CROSS-REFERENCE TO RELATED APPLICATIONS

This application is a continuation of U.S. patent application Ser. No. 15/843,483, filed Dec. 15, 2017, which is a continuation of U.S. patent application Ser. No. 13/830,621, filed Mar. 14, 2013, each of which is hereby incorporated by reference herein in its entirety.

TECHNICAL FIELD

The disclosed subject matter relates to methods, systems, and media for displaying information related to displayed content upon detection of user attention.

BACKGROUND

Advertisements are typically shown based on time and/or location. For example, during broadcast television and radio programming, advertisements are often scheduled to display at designated commercial breaks or at designated times during the programming. In online advertising, advertisements are often presented in the web page when the web page is loaded. However, when advertisements are shown based on time and/or location, it can be difficult to determine whether a user is actually viewing an advertisement.

Accordingly, it is desirable to provide methods, systems, and media for displaying information related to displayed content upon detection of user attention.

SUMMARY

In accordance with various implementations of the disclosed subject matter, methods, systems, and media for displaying information related to displayed content upon detection of user attention are provided.

In accordance with some implementations of the disclosed subject matter, a method for presenting information to a user is provided, the method comprising: detecting, using a hardware processor, a presence of a user; retrieving content and associated content metadata; causing the content to be presented to the user in response to detecting the presence of the user; detecting a user action indicative of user attention to at least a portion of the content presented to the user; and in response to detecting the user action, causing information to be presented to the user, wherein the information presented to the user corresponds to the content metadata associated with the portion of the content.

In some implementations, the method further comprises detecting a second user action in response to the information being presented to the user; retrieving supplemental information related to the information; and providing the supplemental information to the user in response to receiving the user interaction.

In some implementations, providing the supplemental information further comprises causing the supplemental information to be presented to a display.

In some implementations, providing the supplemental information further comprises transmitting the supplemental information to a second device.

In some implementations, retrieving supplemental information further comprises: transmitting a search query for supplemental content based on the information; ranking search results responsive to the search query based on the information; and selecting a particular search result from the search results to be provided to the user based on the ranking.

In some implementations, the supplemental information includes at least one of: a web page related to the information; an advertisement related to the information; a source of the content; and search results related to the information.

In some implementations, causing the content to be presented and detecting a user action indicative of attention are performed concurrently.

In some implementations, detecting a user action indicative of user attention further comprises detecting that a face angle of the user is within a predetermined angle of a display used for presenting the content.

In some implementations, detecting the user action further comprises determining that the user action is maintained over a specified period of time.

According to some implementations of the disclosed subject matter, system for presenting information to a user is provided, the system comprising: a hardware processor configured to: detect a presence of a user; retrieve content and associated content metadata; cause the content to be presented to the user in response to detecting the presence of the user; detect a user action indicative of user attention to at least a portion of the content presented to the user; and in response to detecting the user action, cause information to be presented to the user, wherein the information presented to the user corresponds to the content metadata associated with the portion of the content.

According to some implementations of the disclosed subject matter, system for presenting information to a user is provided, the system comprising: detecting a presence of a user; means for retrieving content and associated content metadata; means for causing the content to be presented to the user in response to detecting the presence of the user; means for detecting a user action indicative of user attention to at least a portion of the content presented to the user; and means for causing information to be presented to the user in response to detecting the user action, wherein the information presented to the user corresponds to the content metadata associated with the portion of the content.

In some implementations, the system further comprises means for detecting a second user action in response to the information being presented to the user; means for retrieving supplemental information related to the information; and means for providing the supplemental information to the user in response to receiving the user interaction.

In some implementations, the system further comprises means for causing the supplemental information to be presented to a display.

In some implementations, the system further comprises means for transmitting the supplemental information to a second device.

In some implementations, the system further comprises: means for transmitting a search query for supplemental content based on the information; means for ranking search results responsive to the search query based on the information; and means for selecting a particular search result from the search results to be provided to the user based on the ranking.

In some implementations, the supplemental information includes at least one of: a web page related to the information; an advertisement related to the information; a source of the content; and search results related to the information.

In some implementations, the system further comprises means for detecting a user action indicative of attention are performed concurrently.

In some implementations, the system further comprises means for detecting that a face angle of the user is within a predetermined angle of a display used for presenting the content.

In some implementations, the system further comprises means for determining that the user action is maintained over a specified period of time.

In accordance with some embodiments of the disclosed subject matter, a non-transitory computer-readable medium containing computer executable instructions that, when executed by a processor, cause the processor to perform a method for presenting information to a user is provided, the method comprising: detecting a presence of a user; retrieving content and associated content metadata; causing the content to be presented to the user in response to detecting the presence of the user; detecting a user action indicative of user attention to at least a portion of the content presented to the user; and in response to detecting the user action, causing information to be presented to the user, wherein the information presented to the user corresponds to the content metadata associated with the portion of the content.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
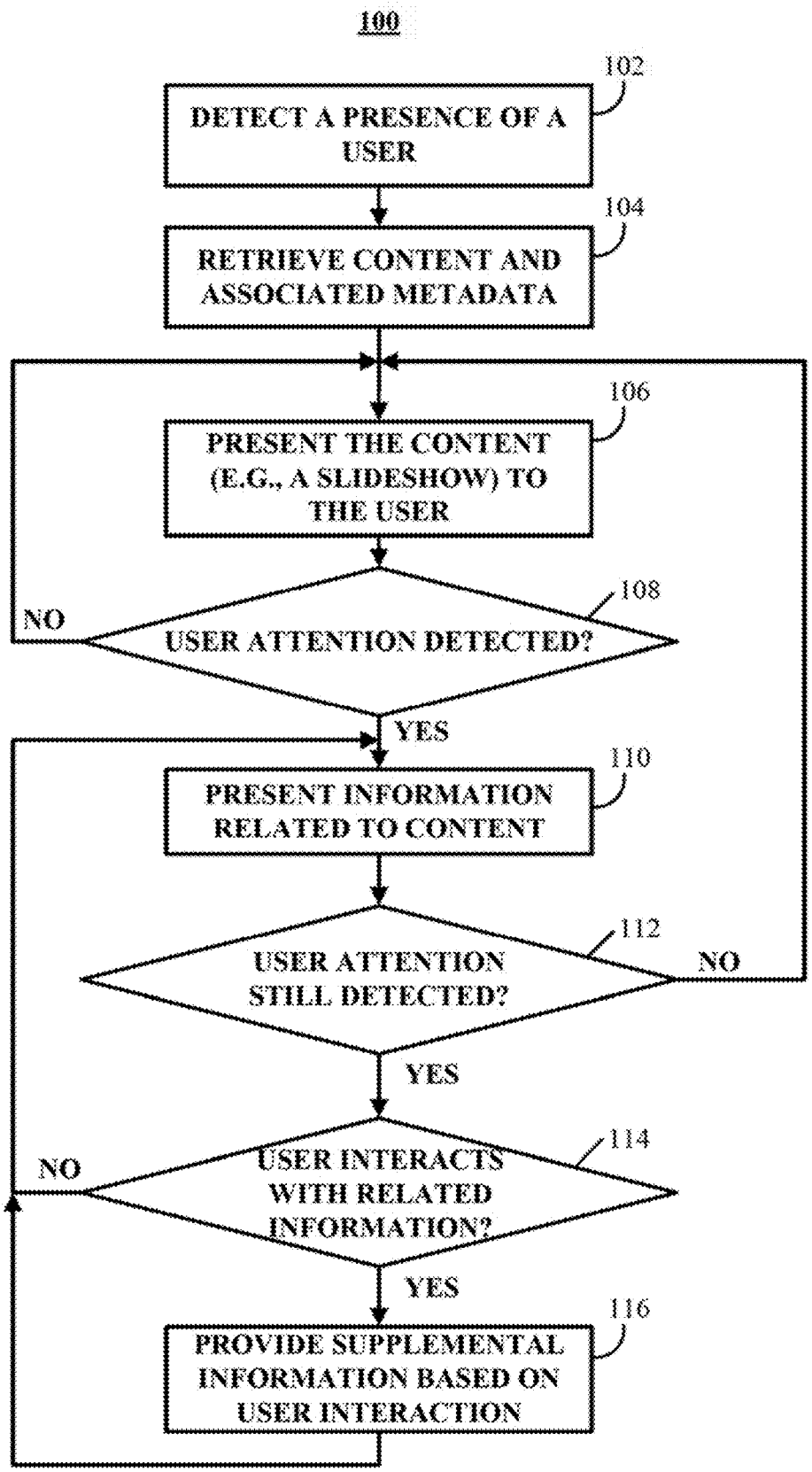
FIG. 1 shows an illustrative example of a process for displaying information related to displayed content upon detection of user attention in accordance with some implementations of the disclosed subject matter.

In accordance with various implementations, mechanisms (which include methods, systems, and media) for displaying information related to displayed content upon detecting user attention are provided. Generally speaking, information related to content can be presented when a user performs a user action indicative of attention to the content. For example, the mechanisms can present content to a user that is otherwise occupied and, upon detecting that the user has looked at the content, the mechanisms can display information related to the content currently being displayed. In a more particular example, a user may be reading a book while sitting in front of a television that is displaying content presented by the mechanisms (e.g., a slideshow of images, etc.). A particular item of content catches the user's eye (e.g., a particular image grabs the user's attention) and the user looks at the television screen as the particular item is being displayed. In response to this detection, the mechanisms can present additional information related to the particular item of content to the user.

It should be noted that, prior to detecting one or more user actions indicative of attention to the content, these mechanisms can provide the user with an opportunity to provide a consent or authorization to perform such detections. For example, upon loading an application on a computing device, such as a television device, the application can prompt the user to provide authorization for performing such detections, transmitting information relating to the detections, and/or presenting additional information relating to a content item of interest. In a more particular example, in response to downloading the application and loading the application on the computing device, the user can be prompted with a message that requests (or requires) that the user provide consent prior to performing these detections. Additionally or alternatively, in response to installing the application, the user can be prompted with a permission message that requests (or requires) that the user provide content prior to performing these detections and/or transmitting information relating to these detections. In the instance where the user consents to the use of such data, information relating to the detections can be used for displaying information related to the displayed content.

In some implementations, the mechanisms can automatically present the content to a user when the application detects the presence of a user. For example, if a user enters a living room environment that has a media device that is executing the mechanisms and the mechanisms detect the user's presence, the mechanisms can begin presenting content for the user. As another example, if the mechanisms are set on a timer, the mechanisms can present content based on a time of day, a day of the week, etc. As yet another example, if a user has chosen to associate a mobile device (e.g., a smartphone, a mobile phone, a tablet computer, etc.) with a media device executing the mechanisms, the mechanisms can detect the presence of the mobile device on a network that is connected to the media device executing the mechanisms, and the mechanisms can begin presenting content.

In some implementations, the content to be presented can include one or more content items. The content items can include images, videos, advertisements, audio, user-generated content, text, etc. For example, the content items can include a collection of images that can be presented to the user as a slideshow (e.g., multiple image files stored in a media device and/or database). As another example, the content items can include a collection of video clips that can be presented to the user as a slideshow of video clips. As yet another example, the content items can include multimedia advertisements (e.g., images, text, video, etc.). By way of example, the content items are often discussed herein as a slideshow of images. It should be noted that, although the implementations and examples generally describe a slideshow of images, the content items can contain various different types of content. For example, the content can include stored content on a digital video recorder (DVR).

In some implementations, the content items can include a combination of different types of content items. For example, the content items can include images, videos and advertisements. As another example, audio clips such as songs (or portions of songs) can be included in the content. In such an example, a song can be played while other content items are being presented to the user.

In some implementations, a single content item can be presented to the user at a time. For example, in a slideshow of images, a single still image can be presented to the user for a predetermined period of time, and after the predetermined period of time has elapsed a next image can be presented to the user.

In some implementations, multiple content items can be presented to the user at the same time. For example, multiple items can be displayed on a display in a non-overlapping fashion and the items can be displayed for a period of time before being replaced. In such an example, the time at which the content items are replaced can be staggered such that the content items are displayed overlapping in time. In another example, multiple content items can be displayed in a partially or fully overlapping fashion. In such an example, the position where the content items are displayed within the screen can be changed in time and the content items can move together or independently.

In some implementations, where multiple content items are simultaneously displayed, different types of content items (e.g., images, videos, advertisements, etc.) can be displayed together. For example, images and videos can be displayed simultaneously in a partially overlapping or a non-overlapping fashion.

In some implementations, the content items being presented to the user can act as a background application that is not intended to be the focus of the user's attention for a sustained period of time. For example, a media device that is playing music can also display content items in accordance with the mechanisms described herein in cases where the media device is coupled to a display. As another example, if a user is reading a book in her living room, the mechanisms described herein can be used to display content as a background activity. As yet another example, the mechanisms described herein can be used to display images that can help set an ambiance desired by the user if the user is having a party. As yet another example, the mechanisms described herein can be used to provide dynamic decoration to a public or private space, such as an airport terminal, a restaurant, a user's living room, etc.

In some implementations, content metadata can be associated with the content items. The content metadata can contain information that describes the content item. This can include information about the type of information contained in the content file (e.g., an image, a video, a file type, etc.), information about the subject of the content item (e.g., a description of what is depicted in an image), a location where the content item was recorded (in the case of an image, a video, etc.), a source where the content item originates (for example, a blog post, a web page, etc.), etc. In some implementations, the metadata can also include indices that are used to classify the content item.

In some implementations, a user can choose to enable the content items to be displayed based on the identity of the user that is present. For example, the user can set content consumption preferences for what type of content the user enjoys. More particularly, one or more categories can be presented to the user for selection. Additionally, each of the categories can include sub-categories for selection by the user. For example, categories, such as landscapes, animals, sports, art, etc. can be presented to the user for selection. The landscape category can include sub-categories such as beaches, mountains, lakes, etc.

In some implementations, the preferences of a user can be discovered based on observed user interest. For example, if it is determined that the user often pays attention when images of panda bears are shown, more images of panda bears and other animals similar to panda bears can be selected as content items for presentation to the user.

In some implementations, when it is determined that a user looks at a content item being displayed (or otherwise shows attention to the content item), the mechanisms can cause information related to the content item to be displayed to the user. For example, the related information can be an advertisement that is chosen at least partially based on the contents of the content item. More particularly, content metadata that is associated with the content item can be used in retrieving an advertisement to be presented as the related information. As another example, an article or web page related to the content item can be presented to the user. As yet another example, facts about what is depicted in the content item can be displayed as the related information.

In some implementations, a particular user's attention can trigger the display of related information, while attention by other users can be ignored or otherwise disregarded. For example, a particular user can set up a profile associated with the mechanisms. In such an example, when content is being displayed the attention of the particular user associated with the profile can trigger the display of related information, while attention of a user that is not associated with a profile can be disregarded or ignored.

In some implementations, upon presenting related information to a user, the mechanisms can receive a request for supplemental information. For example, if a snippet of an article that accompanied an image is presented as related information when the image is presented as content, the user can request that a copy of the article be accessed so that the user can read the article. In such an example, the article can be presented using the display being used to present the content items. Additionally or alternatively, the article can be accessed on a second device (e.g., a smartphone, a tablet computer, a laptop computer, a personal computer, etc.) that is not being used to present the content.

Turning to FIG. 1, a content display application can begin by detecting a presence of a user at 102. The presence of a user can be detected using any suitable techniques. For example, in some implementations, the content display application can determine whether a user is present in the vicinity of a display (e.g., near the display, in front of the display, in the same room as the display, etc.). Additionally or alternatively, the content display application can determine whether a user is present in an area such as a floor of a building in which a display is located. Additionally or alternatively, the content display application can determine the presence of a user based on a current time and day. For example, the content display application can assume a user is present during certain times of the day (e.g., from 9 A.M. to 5 P.M.). In some implementations, any suitable combination of techniques can be used to determine the presence of a user.

It should be noted that, prior to detecting the presence of a user or any other suitable detections described herein, the content display application can provide the user with an opportunity to provide a consent or authorization to perform such detections. For example, upon loading the content display application on a computing device, such as a television device, the application can prompt the user to provide authorization for performing such detections, transmitting information relating to the detections, and/or presenting additional information relating to a content item of interest. In a more particular example, in response to downloading the content display application from a suitable marketplace and loading the content display application, the user can be prompted with a message that requests (or requires) that the user provide consent prior to performing a detection of user presence. Additionally or alternatively, in response to installing the content display application, the user can be prompted with a permission message that requests (or requires) that the user provide content prior to performing these detections and/or transmitting information relating to these detections. In the instance where the user consents to the use of such data, user presence at 102 can be detected.

In some implementations, the presence of a user can be detected using a camera or other suitable imaging device that periodically captures images and detects the presence or absence of a user in the images. For example, the camera can capture images every second (or every five seconds, ten seconds, or any other suitable interval of time) and the content display application can determine whether a user is present in the image using any suitable image processing technique. More particularly, the content display application can detect differences between consecutive images to determine a user's presence, where differences above a threshold amount can indicate the presence of a user.

In another example, if the camera or other suitable imaging device is configured to measure distance as well as images (e.g., through use of projected light, through use of stereoscopic imaging, through use of detecting a focusing state of the camera sharpness of a subject, etc.), an estimated size of a subject can be determined based on a distance to the subject and the subjects relative size in an image. The estimated size can be compared to a size of a user and if the sizes match the content display application can determine that the user is present.

In yet another example, the content display application can detect whether a face is present in the application using facial recognition techniques that determine the presence of a human face in an image. In still another example, if the content display application detects a face, the content display application can use a facial recognition process to determine whether the face is a particular user's face. It should be noted that in such an example, the mechanisms can detect the presence or absence of a face and not record the identity of the face or the activities of the user.

In still another example, the content display application can perform image processing on the image captured by the camera to determine if a human is present in the image by recognizing various characteristics of a human figure such as a head, one or more arms, a torso, etc. In some implementations, any of the techniques described herein can be used to determine whether a user is present using a camera. In some implementations, any suitable technique can be used to determine whether a user is present using a camera.

In some implementations, a motion detector can be used to determine if a user is present. For example, the content display application can receive a signal that indicates whether motion has been detected. If motion has been detected, the content display application can make a determination that a user is present.

In some implementations, detection of a connection between a device (e.g., a set-top box, a digital media receiver, a smart television, a game console, etc.) executing the content display application and a device associated with a user can indicate that a user is present. Such a connection can be an ad-hoc wireless connection, a common connection to a local area network (LAN) and/or a wireless LAN, a Bluetooth connection, a near-field communication connection, a Universal Serial Bus (USB) connection, a wireless USB connection, a connection using light waves, etc.

For example, a device executing the content display application can be connected to a LAN and can detect when a second screen device (e.g., a smartphone, a tablet computer, a laptop computer, etc.) associated with a user establishes a connection with the LAN. In such an example, the content display application can determine that the user is present when the second screen device associated with the user establishes a connection with the LAN.

In another example, a device executing the content display application can be configured to connect to a device associated with a user using a Bluetooth communication standard when the device associated with the user is within a Bluetooth connection range. In such an example, the content display application can determine that the user is present when the device executing the content display application establishes a connection with the device associated with the user.

In some implementations, detection of a user launching an application can be used to indicate that a user is present. For example, a user can issue an instruction to a device that executing the content display application that instructs a processor to launch the content display application. More particularly, the user can use an input device, such as a keyboard, remote control, touchscreen, etc. to instruct the processor to launch the content display application.

In some implementations, an identity of the user can be determined at 102 and the identity of the user can be used to retrieve content customized for the identified user. As described below, such identity information can be used to determine content to be displayed based on preferences and/or characteristics of the identified user. In one example, facial recognition techniques can be used to determine an identity of a particular user whose presence has been detected. In another example, a size and shape of a user can be used to determine an identity of a particular user whose presence has been detected. In yet another example, an identification (such as an Internet Protocol ("IP") address, a Media Access Control ("MAC") address, etc.) of a user device present on a network can be used to determine an identity of a particular user whose presence has been detected, for example, by the presence of the user device on the network. In still another example, credentials (e.g., a username, a password, etc.) entered by a user by logging in to a media device executing the content display application can be used to identify a user.

Figure 2:
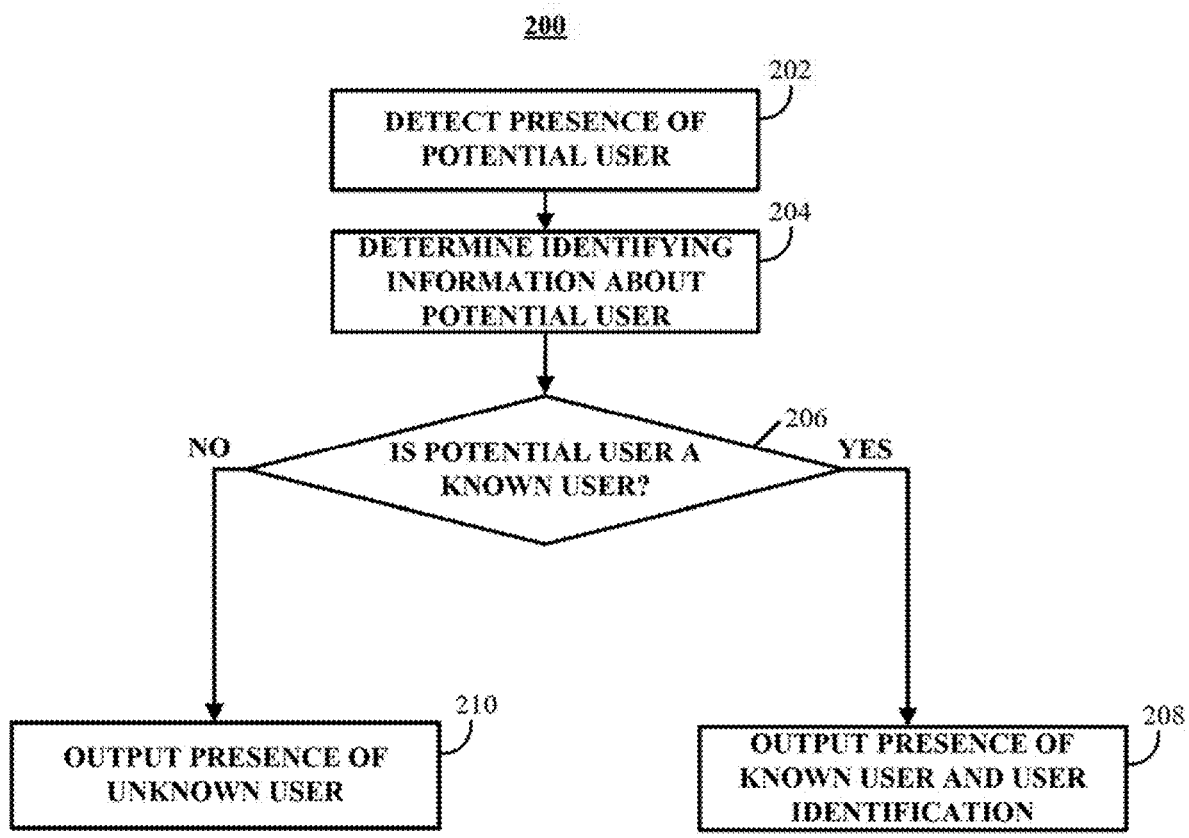
FIG. 2 shows an illustrative example of a process for detecting a presence of a user in accordance with some implementations of the disclosed subject matter.

FIG. 2 shows an example 200 of a process for detecting the presence of a user in accordance with some implementations. At 202, the presence of a potential user can be detected using any suitable technique. For example, an image from a camera can be analyzed to detect the presence of a potential user. As another example, a motion detector can be used to detect the presence of a potential user. As yet another example, a presence of a user device can be detected if a communication is received that indicates the presence of the user device.

At 204, identifying information about the potential user can be determined. In some implementations, identifying information can be identifying information associated with the potential user. For example, facial features of the potential user can be determined for performing facial recognition. As another example, a size and/or shape of the potential user can be determined. In some implementations, identifying information can be determined by determining identifying information, such as an identification number. For example, a user device identification number associated with a user device can be determined.

At 206, it can be determined whether the identity of the potential user corresponds to a known user. In some implementations, a list (or database) of known users and associated identity information of the known users can be stored. The identity of the potential user can be compared to the list (or database) to determine if the potential user is a known user. For example, facial features of the potential user can be compared to facial features of a known user. As another example, the user device identification number associated with the potential user can be compared to user device identification numbers of known user devices.

If the potential user is determined to be a known user ("YES" at 206), the presence of a known user and user identification information identifying the known user can be output at 208. Otherwise, if the potential user is determined to be an unknown user ("NO" at 206), the presence of the unknown user can be output at 210.

In some implementations, the content display application can execute process 200 to determine the presence of a user and whether the user is a known user or an unknown user. Alternatively, the content display application can receive an input from another application and/or another device indicating the presence of a user and whether the user is a known or unknown user. For example, a camera coupled to a device executing the content display application can include a processor and a list of known users, and the camera can output a signal to the device executing the content display application that indicates the presence of a user and whether the user is a known user or an unknown user.

In some implementations, the information indicating that the user is a known user or an unknown user can be used in determining what content to display and whether a user has performed an action indicative of user attention, as described below herein. For example, as described below in connection with 104, which content is retrieved to be presented to the user can be based on an identity of the user whose presence is detected. As another example, as described below in connection with 108, detection of user attention can be based on whether a user is known or unknown. In such an example, detection of attention for an unknown user can be ignored or the content display application can inhibit detection of attention for an unknown user. As yet another example, detection of user attention can be based on detecting a combination of actions by a user, such as detecting that a face angle of the user indicates user attention and concurrently detecting a voice command of the user. In such an example, a user can be provided with an opportunity to choose actions to be used by the content display application to detect user attention from, for example, a list of actions that may indicate user attention.

Returning to FIG. 1, the content display application can retrieve content and associated content metadata at 104. In some implementations, the content can be retrieved from memory of a device executing the content display application. For example, the content display application can retrieve content from non-volatile memory (e.g., a hard drive, a solid state drive, a flash memory, an optical disk, etc.) of the device executing the content display application (e.g., a set-top box, a digital media receiver, a laptop computer, etc.). As another example, the content display application can retrieve content from volatile memory (e.g., random access memory ("RAM"), etc.). In such implementations, a processor of the device executing the content display application can cause the content and associated content metadata to be retrieved from memory.

Additionally or alternatively, the content can be retrieved from a media device connected to a local area network to which the device executing the application is connected. For example, the device executing the application can request content and associated content metadata from a non-volatile memory of a media device connected to the same local area network. More particularly, the device executing the content display application can request content and content metadata from a second device (e.g., a set-top box, a digital media receiver, a laptop computer, a personal computer, etc.) connected to the same local area network. In response to receiving a request for content and content metadata, a processor of the second device can retrieve the content and content metadata from memory or any other suitable storage and cause the content and content metadata to be transmitted (for example, over the network to which the device executing the content display application and the second device are connected, e.g., a LAN) to the device executing the content display application. In such implementations, a processor of the device executing the content display application can receive the content and content metadata transmitted by the second device.

Additionally or alternatively, the content can be retrieved from a remote device (e.g., a server, etc.) connected to the device executing the content display application by a network (e.g., the Internet, etc.) or a combination of networks (e.g., a LAN and the Internet, etc.). For example, the device executing the application can request content and associated content metadata from a server through a network (e.g., the Internet). In response to receiving the request for content and content metadata, the server can cause the requested content and content metadata to be transmitted to the device executing the application. In such implementations, a processor of the device executing the content display application can receive the content and content metadata transmitted by the remote device.

In some implementations, a processor of the device executing the content display application can request content and associated content metadata from a server in response to detection of a presence of a user at 102. For example, updated content (having associated content metadata) to be presented by the content display application can be requested from a server in response to detection of a user's presence. This can allow for new and/or updated content to be displayed to a user each time a user's presence is detected. In such implementations, a processor of the device executing the content display application can receive the content and content metadata transmitted by the server.

In some implementations, a processor of the device executing the content display application can request content and associated content metadata from a server periodically. For example, the processor can request content and associated content metadata from the server and store content and associated content metadata received in response to the request. In response to a user's presence being detected at 102, the processor can retrieve content and determine when the content was received. If a predetermined period of time has passed since the content was received (e.g., 24 hours, one week, etc.), the processor can request new and/or updated content from the server.

At 106, the content display application can cause the content to be presented on a display device. In some implementations, the content can be a slideshow of images. In one example, each of the images in the slideshow can be presented to the user one at a time for a predetermined period of time (e.g., fifteen seconds, thirty seconds, etc.). In such implementations, the slideshow can include images from one source or multiple sources (e.g., a locally stored database of images, images stored on a media device connected to a LAN, a server, etc.). Furthermore, the images to be displayed can be selected using any suitable technique as described herein. For example, the images can be popular images related to one or more topics of interest to the user. In some implementations, the content can include videos that are played back to the user.

At 108, the content display application can detect whether a user has performed an action indicative of user attention. In some implementations, the content display application can receive a signal regarding an angle of a user's face with respect to a display utilized for presentation of the content. In such implementations, the content display application can determine that user attention is detected when the angle between the user's face and the display is less than a threshold angle (e.g., when the angle is less than 15 degrees, 20 degrees, etc.).

In one particular example, if a user is using a second screen device (e.g., a laptop computer) in front of a display while the content display application causes a slideshow of images to be displayed on the display, it may be likely that the angle between the user's face and the display is greater than the threshold angle. As long as this is the case, the content display application does not detect user attention. However, if an image that is displayed catches the user's attention, the user can look up to, for example, see the image more clearly. In response, the content display application can detect that the user has performed an action indicative of user attention when the user looks up from reading to see the image being displayed.

Additionally or alternatively, the angle of the user's face with respect to the display can be determined by the content display application from an image (or images) received from a camera (or cameras) coupled to the device executing the content display application, and the result can be used in determining whether a user has performed an action indicative of user attention.

In some implementations, the content display application can receive a signal regarding an eye-gaze direction of a user's eye(s) with respect to a display utilized for presentation of the content. In such implementations, the content display application can determine that user attention is detected when an angle between the user's eye-gaze direction and the display is less than a threshold angle (e.g., when the angle is less than 15 degrees, 20 degrees, etc.). Additionally or alternatively, the direction of the user's eye-gaze with respect to the display can be determined by the content display application from an image (or images) received from a camera (or cameras) coupled to the device executing the content display application, and the result can be used in determining whether a user has performed an action indicative of user attention.

In some implementations, the content display application can receive a signal regarding a position of a user's hand and/or arm with respect to the user and/or with respect to a display utilized for presentation of the content. In such implementations, a change in position of the user's hand and/or arm from a first position to a raised position can indicate user attention. For example, if the content display application determines that the user is pointing at the display this can be an action that indicates user attention. As another example, if the content display application determines that the user's hand moved from a position close to the user's body to an outstretched position this can be an action that indicates user attention. As yet another example, if the content display application determines that the user's hand is waving this can be an action that indicates user attention.

In some implementations, the content display application can receive a signal regarding an action taken by the user with respect to a user device used for interacting with the content display application and/or the display used for presenting content to the user. For example, if a remote control is configured to detect motion (e.g., through the use of accelerometers, gyroscopes, etc.) and is associated with a media device executing the content display application and/or a display used for presenting content to the user, the content display application can receive a signal indicating that motion of the remote control has been detected. This can be interpreted as an indication of user attention by the content display application.

As another example, if a second screen device (e.g., a smartphone, a tablet computer, a laptop computer, etc.) associated with the user is connected to a device executing the content display device (directly, through a local area network, etc.), a user action at the second screen device and/or movement of the second screen device (if the second screen device is configured to detect motion) can be communicated to the content display application. The content display application can use the communication to determine whether the user action and/or movement is indicative of user attention. More particularly, unlocking a second screen device from a locked mode, waking a second screen device from a sleep mode, picking up a second screen device, opening a web browser on a second screen device, etc. are examples of user actions that can be interpreted as user attention.

In some implementations, the content display application can receive a signal regarding a sound detected by a microphone (or microphones) coupled to a device executing the content display application. For example, if the content display application detects that a user said something about the content presented to the user, the content display application can interpret this as an action indicative of user attention. In such an example, if the content display application determines that the user said a word that matches a word (or a synonym of a word) in the associated content metadata, the content display application can determine that the user is paying attention to the displayed content. As another example, if the content display application determines that the user has made any recognized vocalization, the content display application can interpret this as an action indicating user attention.

In some implementations, the content display application can be responsive to any user paying attention to the content displayed by the content display application. For example, if a user's face angle is used to detect user attention, any face recognized in an area in front of a screen that has an angle to the display less than a threshold can indicate user attention. More particularly, in such implementations, the content display application does not distinguish one face from another and therefore any person that is determined to be paying attention can trigger the display of related information.

In some implementations, the content display application can be sensitive to the actions of a particular user (or particular users) and disregard other users. For example, the content display application can recognize a known user(s) (e.g., a user that has created and/or associated a profile in connection with the content display application) using any suitable techniques (e.g., facial recognition, size recognition, voice recognition, device identification, etc.) and can detect user actions indicative of user attention from the known user(s). This can allow the content display application to ignore unknown users (e.g., users that do not have a profile) and only respond to known users.

If the content display application detects a user action indicative of user attention ("YES" at 108), the content display application can move to 110. Otherwise, if it is determined that user attention has not been detected ("NO" at 108), the content display application can return to 106 and continue to cause the content to be presented.

Figure 3:
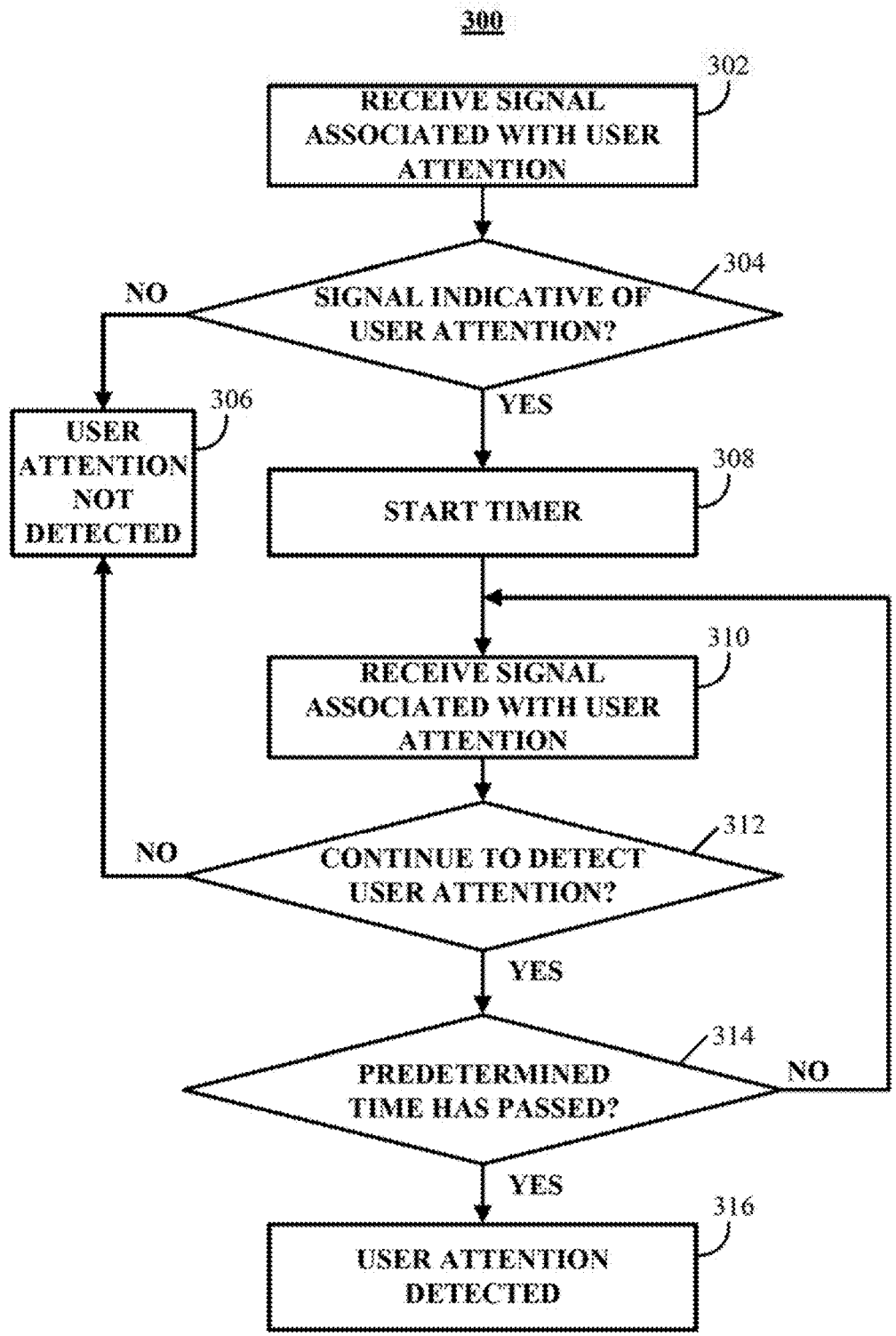
FIG. 3 shows an illustrative example of a process for detecting an action indicative of user attention in accordance with some implementations of the disclosed subject matter.

FIG. 3 shows an example 300 of a process for detecting user attention in accordance with some implementations. At 302, the content display application can receive a signal associated with user attention. Any suitable signal associated with user attention can be received at 302, including the signals described above. For example, in some implementations, the signal can be related to an angle of the user's face with respect to a display. Additionally or alternatively, a position of a user's hand can be determined and a signal indicating the position of the user's hand can be received at 302.

At 304, the content display application can determine if user attention is indicated by the signal. In some implementations, the content display application can determine if an angle of a user's face with respect to a display is less than a threshold angle (e.g., 10 degrees, 20 degrees, etc.). For example, the content display application can use image analysis techniques to determine from an image of the user whether the user is likely to be paying attention to the content presented at 106 based on the angle of the user's face.

In some implementations, the signal received at 302 can include information on the angle of the user's face with respect to a display, and the content display application can determine if the angle indicates that the user is paying attention to the content presented at 106.

If user attention is not indicated by the signal ("NO" at 304), the content display application can move to 306 and indicate that user attention is not detected. Alternatively, if user attention is indicated by the signal ("YES" at 304), the content display application can start a timer at 308.

In some implementations, the timer started at 308 can be a counter that indicates a number of frames where user attention is indicated. Additionally or alternatively, the timer can be a counter that counts a time (e.g., number of nanosecond, microseconds, milliseconds, etc.) that has elapsed from the time when the timer is started at 308.

At 310, the content display application can receive a signal associated with user attention. In some implementations, the signal received at 310 can be similar to the signal received at 302. Additionally or alternatively, the signal received at 310 can indicate a difference between a current state of user attention and a previous state of user attention.

At 312, the content display application can determine if user attention is still detected based on the signal received at 310. In some implementations, a determination at 312 of whether user attention is indicated by the signal received at 310 can be similar to the determination at 304 of whether user attention is indicated by the signal received at 302. For example, whether the angle of the user's face with respect to the display is less than a threshold angle can be determined.

If user attention continues to not be indicated ("NO" at 312), the content display application can move to 306 and indicate that user attention is not detected. Otherwise, if user attention is still indicated ("YES" at 312), the content display application can move to 314.

At 314, the content display application can determine if a predetermined amount of time has passed since the timer was started at 308. In some implementations, if the timer is a counter that counts a number of frames, the predetermined time can be a threshold number of frames (e.g., fifteen frames, thirty frames, etc.). Alternatively, if the timer that counts the time that has elapsed since the timer was started, the predetermined time can be a threshold amount of time (e.g., 500 milliseconds, one second, etc.).

If the predetermined amount of time has not passed ("NO" at 314), the content display application can return to 310. Otherwise, if the predetermined amount of time has passed ("YES" at 314), the content display application can move to 316 where a determination can be made that user attention is detected.

In some implementations, if the timer started at 308 is a counter that counts a number of frames where user attention has been detected, the counter can be incremented a specified number of frames (e.g., one frame, two frames, etc.) each time a signal associated with a new frame is received and based on the number of frames captured by a camera since the last signal was received.

In some implementations, in a time between when the timer is started at 308 and when the content display application either determines that user attention is not detected at 306 or that user attention is detected at 316, presentation of content can be paused. This can allow for the content being presented to remain unchanged while user attention is being determined.

In some implementations, if user attention is indicated at 304, the actions of 308-314 can be omitted and process 300 can be conclude by determining that user attention is detected at 316. For example, if the content display application is configured to detect user attention if user attention is indicated in a single frame, the actions of 308-314 can be omitted.

Referring back to FIG. 1, the content display application can, at 110, present information related to the content presented at 106 when user attention is detected at 108. In some implementations, the content display application can display information related to the content that was being presented to the user at the time that user attention was detected. Additionally, when a user action that indicates user attention is detected, the content display application can pause the presentation of content such that new and/or updated content is not presented to the user. Alternatively, if new content is displayed periodically (e.g., every 15 seconds, every minute, etc.), the content display application can start the period over when user attention is first detected corresponding to a particular item of content being presented to the user.

Additionally or alternatively, if there is more than one item of content being presented to the user at the time that user attention is detected, the content display application can make a judgment as to which item of content the user is most likely paying attention to. In one implementation, the content display application can receive a signal indicative of an eye-gaze direction of the user. This information can be used with information about a location of the user with respect to the display and the content currently being displayed to determine which item of content the user is most likely the item that the user is paying attention to. In another implementation, an item located closest to the center of the display at the time user attention is detected can be used to determine which item is most likely the item that interested the user. In yet another implementation, if the content items are displayed at different sizes, the content display application can determine that a largest item is most likely the item that caught the user's interest.

In some implementations, the information to be displayed at 110 can be automatically generated based on the content metadata associated with the content. In one implementation, the content metadata can be used to determine popular results associated with the content metadata. For example, if the content presented to the display at the time user attention is detected is an image with associated content metadata, the content display application can retrieve information to be presented at 110 based on the content metadata. In such an example, one or more keywords or phrases from the content metadata can be used to determine the most popular information related to the content metadata. In a more particular example, if the content is an image of Mount Fuji and the metadata includes the phrase "Mount Fuji," the content display application can retrieve popular web pages and/or news articles related to Mount Fuji. Additionally or alternatively, the content display application can retrieve one or more facts about the subject of the image.

In some implementations, if the content metadata contains geographic coordinates where an image was taken the content display application can retrieve information about the location as related information to be presented at 110. For example, weather information can be retrieved, map information can be retrieved, a name of a city, town, park, etc. depicted in the image can be retrieved, etc.

In some implementations, if the content metadata contains geographic coordinates and direction information (e.g., a compass heading), the content display application can retrieve the names of landmarks located within the content item based on the location where the content item was captured and the direction.

In some implementations, an advertisement related to the content can be retrieved by the content display application based on the content metadata. For example, if a location is included in the content metadata (e.g., a name of a location, geographic coordinates, etc.) the content display application can determine the location and retrieve an advertisement related to travel to the location (e.g., an airline advertisement, hotel rates, etc.) as the related information. As another example, if the content metadata indicates that the content is related to a particular topic (e.g., sports, a celebrity, etc.) the content display application can retrieve an advertisement related to the topic or an advertisement targeted at user's interested in the topic (e.g., an advertisement targeted at sports enthusiasts can be shown, an advertisement targeted at user's interested in celebrities, etc.).

In some implementations, one or more data points about the user can be used to determine information to be presented at 110. For example, if the user has a profile and the profile indicates that the user is a child, information that has been determined to be appropriate for a child can be retrieved to be presented at 110. As another example, if a user has indicated that she does not want to be shown advertisements, the content display application can inhibit advertisements from being retrieved to be presented at 110.

In some implementations, information retrieved for presentation at 110 can be based on one or more interests of a user. These interests can be selected by the user and/or selected automatically by the content display application. For example, the user can select certain interests, such as, travel, sports, cooking, fashion, etc., and these interests can be used in retrieving the information for presentation at 110 and/or retrieving content at 104.

As another example, a user can choose to allow the content display application to retrieve content at 104 and/or retrieve information for presentation at 110 based on learned interests of the user. More particularly, the user can set a privacy level that indicates a level of personalized content to display, where a higher privacy level can allow for less personalization and therefore less personalized related information. If a user chooses to allow the content display application to learn interests, the content display application can note the types of content that the user pays attention to and use this information to infer the interests of the user.

It should be noted that in implementations described herein in which the content display application (or other mechanisms described herein) collects information about a particular user, the user can be provided with an opportunity to control whether the content display application (or other mechanisms) collects information about particular users and/or how collected user information is used by the content display application (or other mechanisms). Examples of information about a user can include the user's interests and identifying information of the user (e.g., information on a user's face, a user profile, user credentials, device identification, etc.). Additionally, certain information about the user can be stored locally (e.g., not shared), encrypted, and/or treated in one or more ways before it is stored to remove personally identifiable information. For example, after capturing an image of a particular user for facial recognition, information that can be used to identify the user can be extracted and the image can be deleted. As another example, the content display application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the content display application (or other mechanisms).

In some implementations, the information retrieved at 110 can include images that have been determined to be similar to the image that attracted the user's interest. For example, if the user showed interest in an image of a mountain, the content display application can show the user images and/or videos of mountains that have been determined to be similar to the image of a mountain that interested the user. As another example, if the user shows interest in an image with a particular person in it (e.g., a particular celebrity), more images of that person can be retrieved to be presented at 110.

At 112, the content display application can determine whether user attention continues to be detected. In some implementations, the same or similar techniques as described above can be used to determine user attention (e.g., face angle, eye-gaze direction, etc.) to determine if the user continues to pay attention.

If the content display application detects that user attention continues to be detected ("YES" at 112), the content display application can move to 114. Otherwise, if it is determined that user attention is not still detected ("NO" at 112), the content display application can return to 106 and continue to cause the content to be presented at 106.

At 114, the content display application can determine if the user has interacted with the related information presented at 110. In some implementations, the content display application can receive a signal indicating that the user requested supplemental information verbally. For example, a microphone coupled to the device executing the content display application can record a user interacting with the related information by requesting more information. In a more particular example, the content display application can use the microphone or any other audio input device to determine that the user provided a particular audio input, such as "more information."

In some implementations, the content display application can receive a signal indicating that the user requested supplemental information electronically. For example, the user can request more information using a remote control device and selecting the related information presented on the display. More particularly, the user can use a remote control that is configured to issue instructions to a device executing the content display application to request supplemental information related to the information presented at 110.

As another example, the user can request more information from a second screen device associated with the user that is connected to the device executing the content display application (e.g., through a local area network, using Bluetooth, etc.). For example, the user can issue a request for supplemental information to the content display device by transmitting instructions using an application executing on the user's second screen device. Such a request for supplemental information can include inputting a particular gesture (e.g., using a touchscreen) using the second screen device, user selection of a particular user interface element on the second screen device, opening a browser on the second screen device, moving the second screen device in a particular pattern (e.g., where the second screen device is configured with motion sensors), etc.

In some implementations, the content display application can receive a signal indicating that the user requested supplemental information visually. For example, the content display application can receive one or more images and/or videos that can be checked to determine if a user is making a specific gesture and/or pose that indicates that the user would like supplemental information. As another example, the content display application can receive a signal indicating that the user is making a specific gesture and/or pose that indicates that the user would like supplemental information. In a more particular example, the content display application can receive a signal indicating that the user's hand is pointing at a display on which the content is being displayed.

If the content display application detects that the user has interacted with the related information ("YES" at 114), the content display application can move to 116. Otherwise, if it is determined that the user did not interact with the related information ("NO" at 114), the content display application can return to 110 and continue to presented related information.

At 116, the content display application can provide supplemental information to the user based on the user interaction detected at 114 and return to 110. In some implementations, the supplemental information can be provided by presenting the supplemental information on the same display on which the content and the information were presented on. For example, the content display application can provide supplemental information to the user by presenting the information on the display. As another example, the content display application can cause a different application (e.g., a web browser application, etc.) to present the supplemental information to the user.

In some implementations, supplemental information can be any suitable information related to the information presented at 110 and/or the content metadata of the content associated with the information presented at 110. For example, supplemental information can include search results based on the information, search results based on the content metadata, background information (e.g., factual information such as an encyclopedia entry, a news article, etc.) related to the information and/or content metadata, advertisements related to the information and/or content metadata, etc. In another example, supplemental information can include search results based on a topic of the content presented at 106. In a more particular example, if the content presented at 106 is a location, supplemental information can include travel package information (e.g., flight prices, hotel prices, flight and hotel packages, etc.). In another particular example, if the content presented at 106 is related to a sporting event, supplemental information can include scores related to the sporting event, ticket information related to the sporting event (e.g., prices for tickets to upcoming events, etc.). In yet another example, the supplemental information can include a source (e.g., a web page where the content appears, a company that owns the content, an author and/or photographer that produced the content, etc.) of the content.

In some implementations, the supplemental information can be provided to the user by transmitting instructions to a second screen device associated with the user to present the supplemental information. For example, the content display application can transmit instructions to a second screen device (e.g., a smartphone, a tablet, a laptop computer, etc.) associated with the user to open a browser application and display the supplemental information. As another example, if there is an application dedicated to interacting with the content display application on the second screen device associated with the user, the content display application can cause such a dedicated application to launch (if it is not already launched) and present the user with the provided supplemental information.

In some implementations, the content display application can provide the supplemental information to the user by sending an e-mail to an e-mail account associated with the user.

In some implementations, if a user signs in to the content display application using an account that is linked to other services (e.g., an e-mail service, an online storage service, a browser synchronizing service, etc.), the content display application can provide the information through any suitable delivery channels linked with the services associated with the user's account.

Figure 4A:
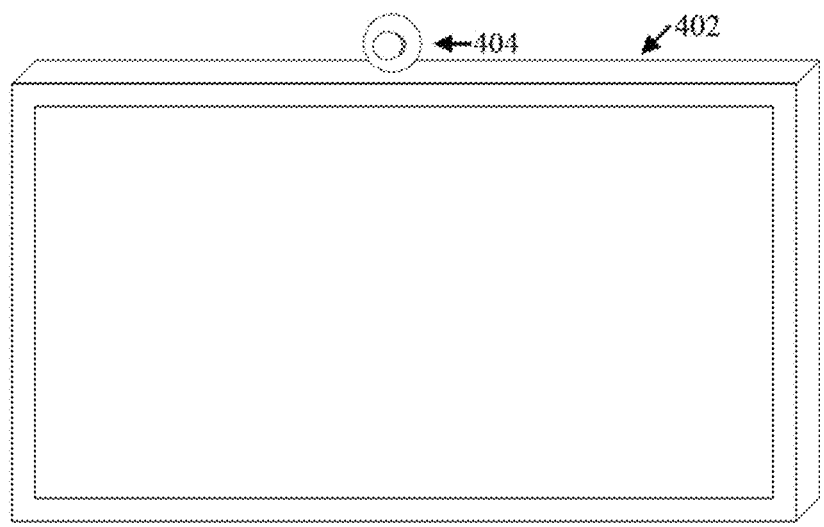
FIGS. 4A-4F show diagrams illustrating an example of a process for displaying information related to displayed content upon detection of user attention in accordance with some implementations of the disclosed subject matter.

FIGS. 4A to 4F show an illustrative example of supplemental information being provided to a user in response to user attention being detected in accordance with some implementations of the disclosed subject matter. FIG. 4A shows an example of a display device 402 and a camera device 404 in accordance with some implementations. In some implementations, display device 402 can execute the content display application in response to detecting the presence of a user. Additionally, camera device 404 can output images that can be used to determine the presence and/or attention of a user in the field of view of the camera. In some implementations, camera device 404 can be coupled to display device 402. Additionally or alternatively, camera device 404 can be incorporated in display device 402.

In some implementations, as described above in connection with FIG. 1, camera device 404 can periodically capture images so that it can be determined if a user is present in the field of view of camera device 404. Additionally or alternatively, camera device 404 can be triggered by a motion detector (not shown), such as an infrared motion detector, and can capture images when motion is detected in the field of view of camera device 404.

Figure 4B:
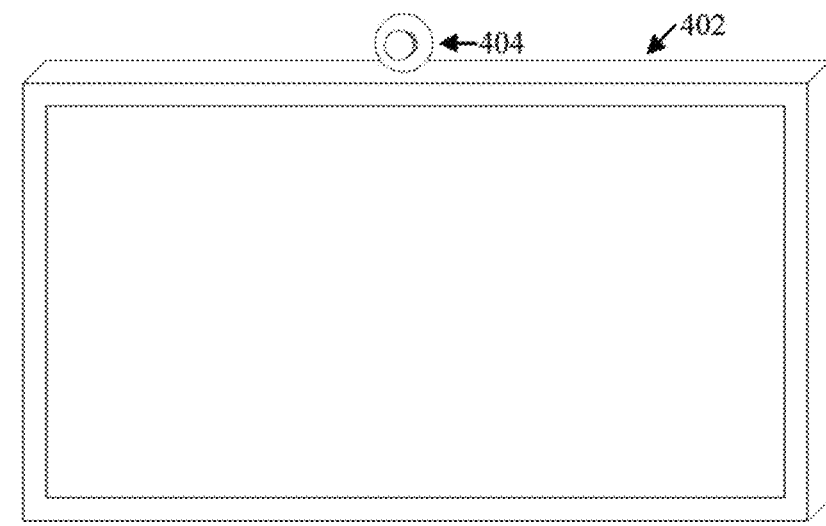
Figure 4B:
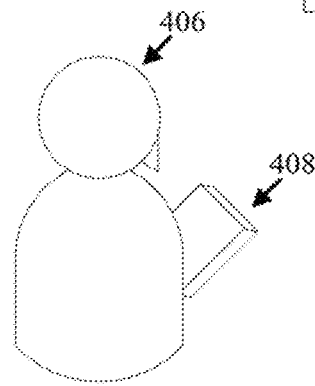

FIG. 4B shows an example where a user 406 has entered the field of view of camera device 404 in accordance with some implementations of the disclosed subject matter. In some implementations, user 406 can be carrying and/or using a second screen device 408 (e.g., a tablet computer, a smartphone, etc.). In this example, the user is using an application running on the second screen device 408 while in front of display device 402. When user 406 enters the field of view of camera device 404, an image can be captured that includes user 406. The image can be processed to determine if a user is present in the field of view of camera device 404. In one example, camera device 404 can perform image processing to the image to detect if a face is present in the image. In such an example, a process for detecting a face in the image can be implemented as hardware, software, firmware, or a combination thereof. In another example, a captured image can be transmitted to a device executing the content display application and the content display application can detect whether a user is present.

In some implementations, the camera and/or the device executing the content display application (e.g., display device 402) can operate in a sleep mode where the amount of power used and a number of features available can be reduced. For example, the camera can capture images at a reduced frame rate (e.g., one frame per second, one frame every five seconds, etc.).

Figure 4C:
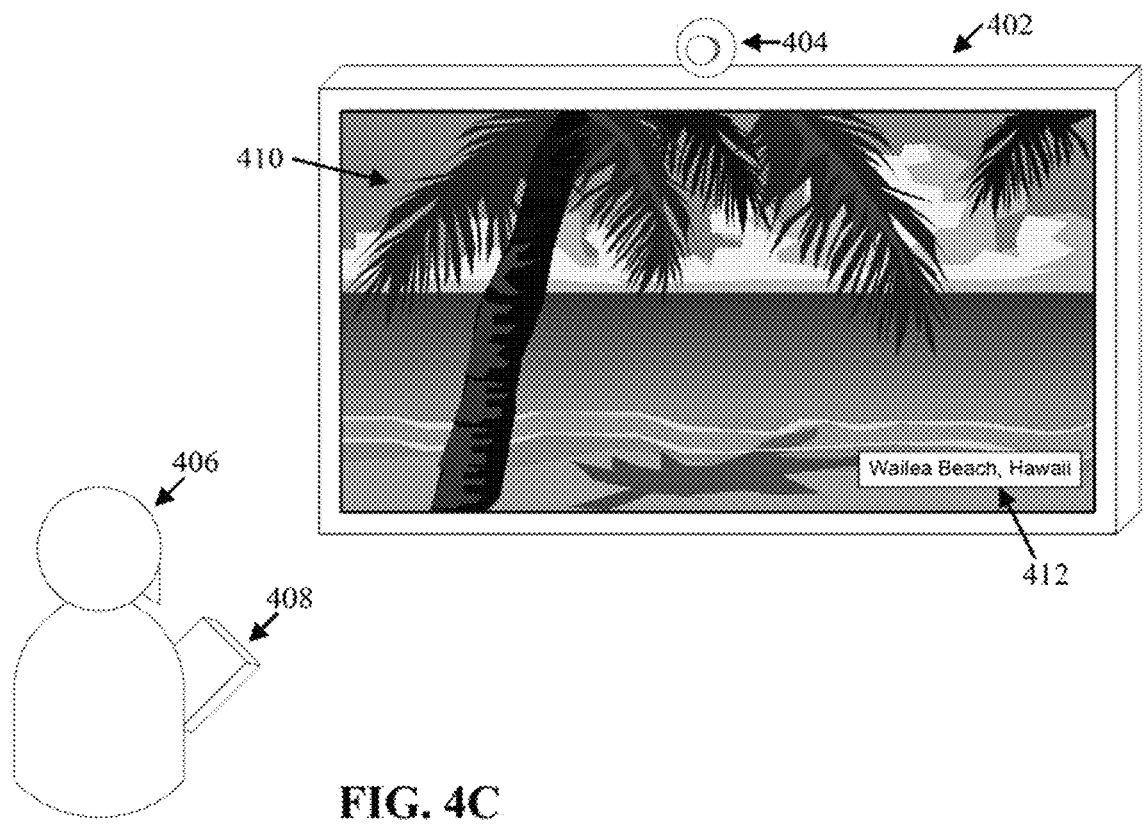

FIG. 4C shows an example of the presentation of content when the presence of user 406 is detected in accordance with some implementations of the disclosed subject matter. In such an example, the content display application can retrieve content and start presenting the content to user 406 on display device 402. In one particular example, popular images (e.g., image 410) of scenic landscapes can be presented to user 406 and a title 412 can be presented on display device 402 that can indicate the location depicted in image 410. In the example shown in FIG. 4C, image 410 shows a beach in Wailea, Hi. In some implementations, title 412 can be determined from associated content metadata received in association with the content being presented to user 406.

FIG. 4C shows an example where user 406 is paying attention to second screen device 408 in accordance with some implementations of the disclosed subject matter. Because the angle between the face of user 406 and display device 402 is greater than the threshold (e.g., because user 406 is looking down at second screen device 408), the content display application does not detect a user action indicative of user attention to the content being presented to the user using display device 402. However, if user 406 turns her face to display device 402 (e.g., because the image of Wailea Beach in Hawaii caught the eye of user 406, or for any other reason), the content display application can detect a user action that indicates user attention to the content being presented. In this case, the content display application can interpret the user turning her head to face the display as indicating that the user is likely looking at the content being presented. It should be noted that the user's actual attention is not interpreted by the content display application, but instead outward actions taken by the user are interpreted to determine the likelihood that the user is paying attention to the content presented to the user.

Figure 4D:
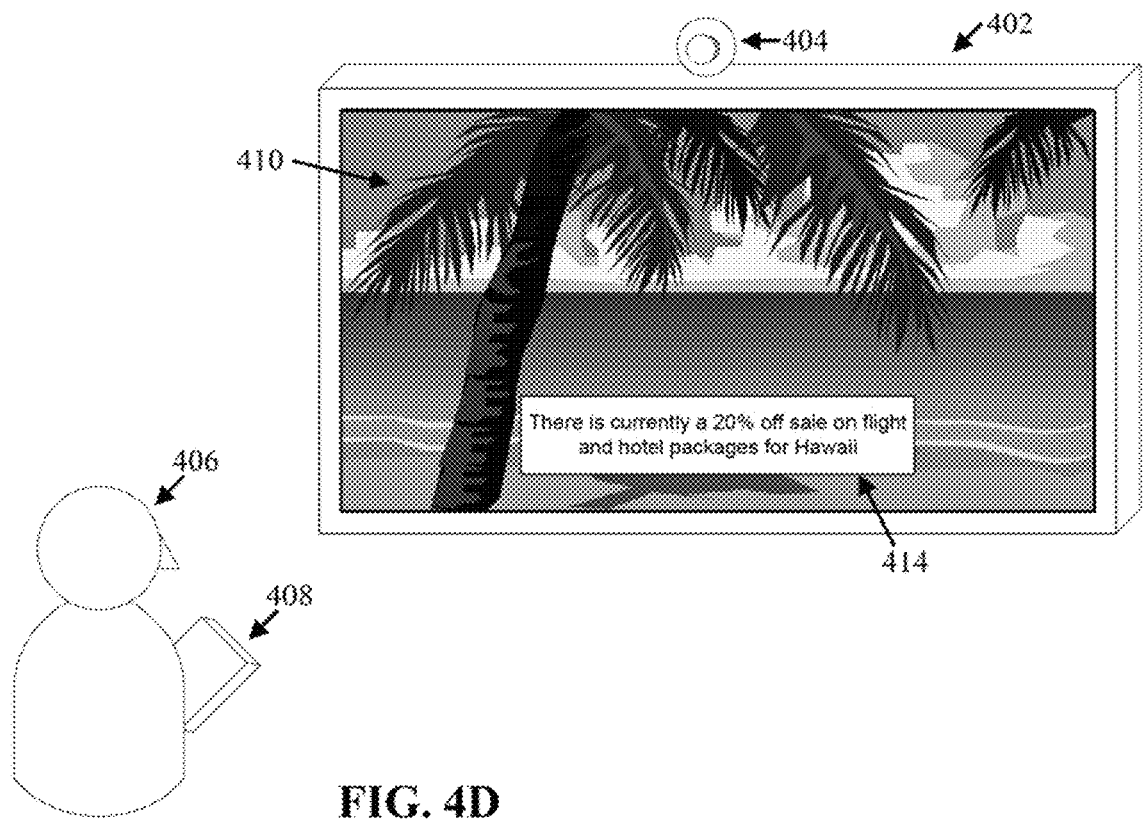

FIG. 4D shows an example of presentation of information 412 when the content display application detects user attention to image 410 being presented using display device 402 in accordance with some implementations of the disclosed subject matter. In such an example, when user 406 turns her face to look at the image 410, the content display application can cause related information 414 to be presented to the user.

As described above, related information, such as related information 414, can be retrieved by the content display application in response to detecting user attention. Additionally or alternatively, the content display application can retrieve related information 414 along with content retrieved for presentation on display device 402 periodically or when content is retrieved and/or updated. In the example of FIG. 4D, related information 414 is showing user information about a sale on flight and hotel packages to Hawaii. In some implementations, related information 414 can be travel related advertising if the user has expressed an interest in travel.

Figure 4E:
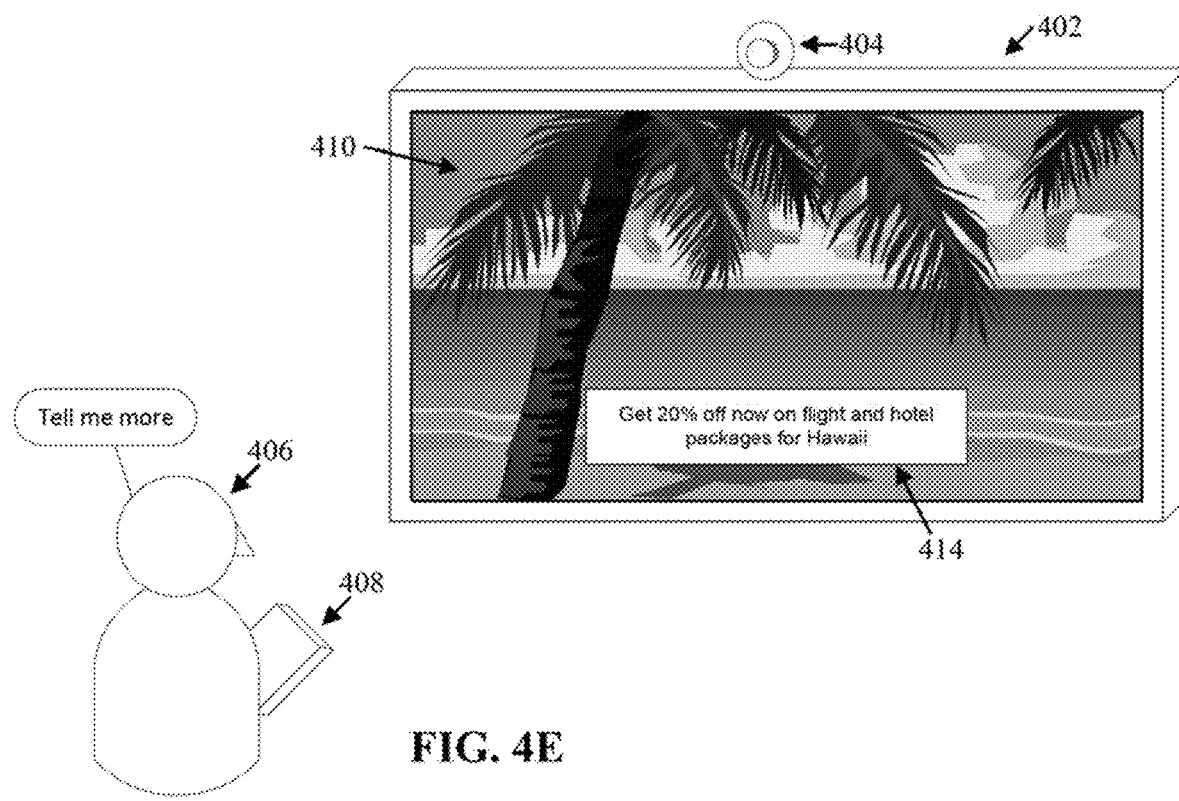

FIG. 4E shows an example of user 406 interacting with related information 414 in accordance with some implementations of the disclosed subject matter. In the example of FIG. 4E, the user verbally interacts with related information 414 by saying, "Tell me more." The user's voice can be converted to a digital signal using, for example, a microphone (not shown) and any suitable signal processing components. In response to the user interacting with related information 414, the content display application can provide supplemental information corresponding to related information 414 to second screen device 408. For example, the supplemental information can be caused to be transmitted over a network (e.g., a LAN, wireless LAN, the Internet, etc.).

Figure 4F:
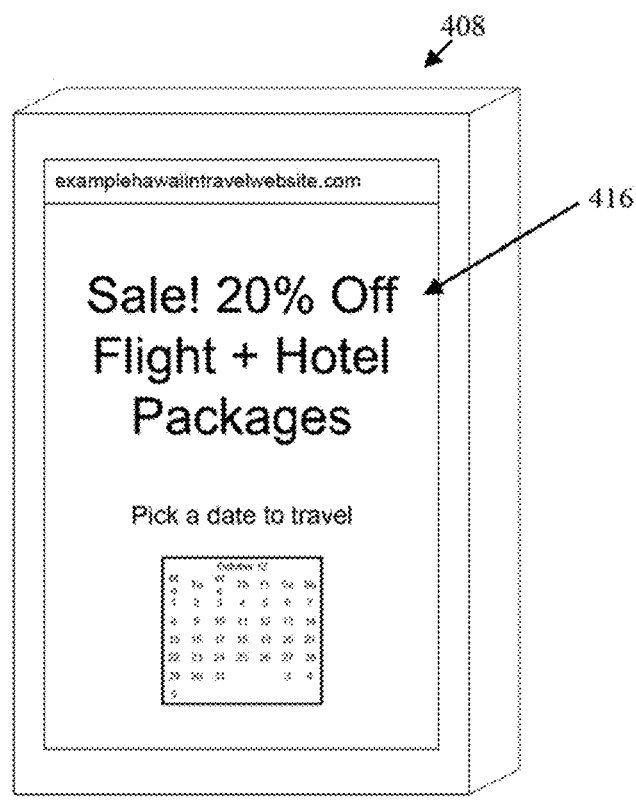

FIG. 4F shows an example of second screen device 408 presenting supplemental information 416 in accordance with some implementations of the disclosed subject matter. In some implementations, if the user interacts with related information 414, the content display application can cause supplemental content 416 to be transmitted to second screen device 408. In one example, the content display application can cause supplemental information 416 to be transmitted to second screen device 408 from a remotely located server. In another example, the content display application can at least temporarily store supplemental information 416 and can then transmit supplement information 416 to second screen device directly (e.g., using Bluetooth, USB, Wireless USB, an ad-hoc wireless network, etc.). In the example of FIG. 4F, user 406 can then further interact with supplemental information 416 by, for example, buying a flight and hotel package.

Figure 5:
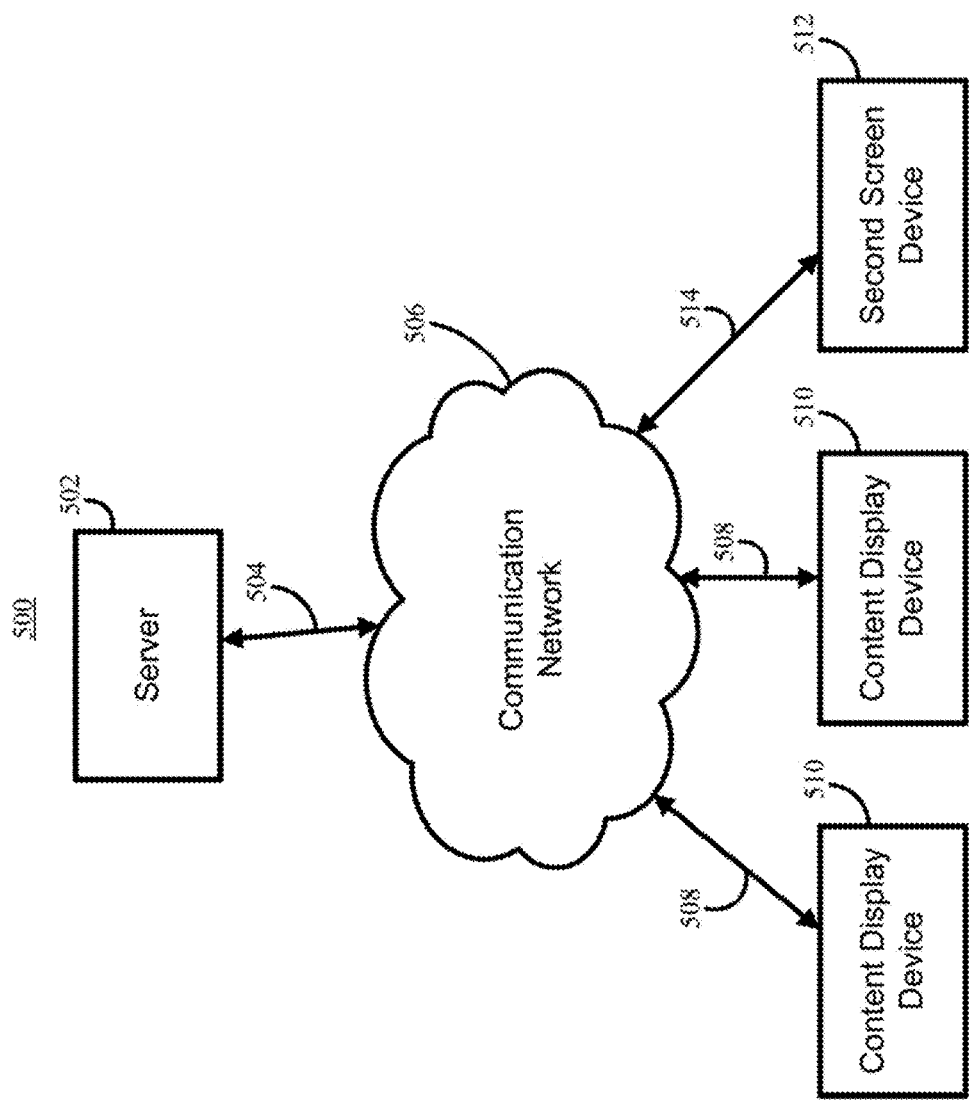
FIG. 5 shows a schematic diagram of an illustrative system suitable for implementation of an application for displaying information related to displayed content upon detection of user attention in accordance with some implementations of the disclosed subject matter.

FIG. 5 shows an example 500 of a generalized schematic diagram of a system on which the mechanisms for displaying information related to displayed content upon detection of user attention described herein can be implemented as a content display application in accordance with some implementations of the disclosed subject matter. As illustrated, system 500 can include one or more content display devices 510. Content display devices 510 can be local to each other or remote from each other. Content display devices 510 can be connected by one or more communications links 508 to a communications network 506 that can be linked via a communications link 504 to a server 502. Content display devices 510 can be connected by communication links 508 to communications network 506 to a second screen device 512 via a communication link 514.

System 500 can include one or more servers 502. Server 502 can be any suitable server such as a processor, a computer, a data processing device, or any suitable combination of such devices for: retrieving content, related information and supplemental information; transmitting such content and/or information to content display devices 510 and/or second screen device 512; and any other suitable functions for executing the content display application. For example, the content display application can be distributed into multiple backend components and multiple frontend components or interfaces. In a more particular example, backend components, such as data collection and data distribution can be performed on one or more servers 502.

In some implementations, each of the content display devices 510, second screen device 512 and server 502 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, content display devices 510 can be implemented as a set-top box, a smart television, a digital-media receiver, a home entertainment system, a personal computer, a laptop computer, a multimedia terminal, a smartphone, a tablet computer, a personal data assistant (PDA), a game console, etc. As another example, second screen device 512 can be implemented as a smartphone, a tablet computer, a personal computer, a laptop computer, a multimedia terminal, a personal data assistant (PDA), etc.

Communications network 506 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 504, 508 and 514 can be any communications links suitable for communicating data among content display devices 510, second screen device 512, and server 502, such as network links, dial-up links, wireless links, hard-wired links, any other suitable communications links, or any suitable combination of such links. Content display devices can enable use of the techniques described herein that can allow the features of the mechanisms to be used. Content display devices 510, second screen device 512 and server 502 can be located at any suitable location.

Figure 6:
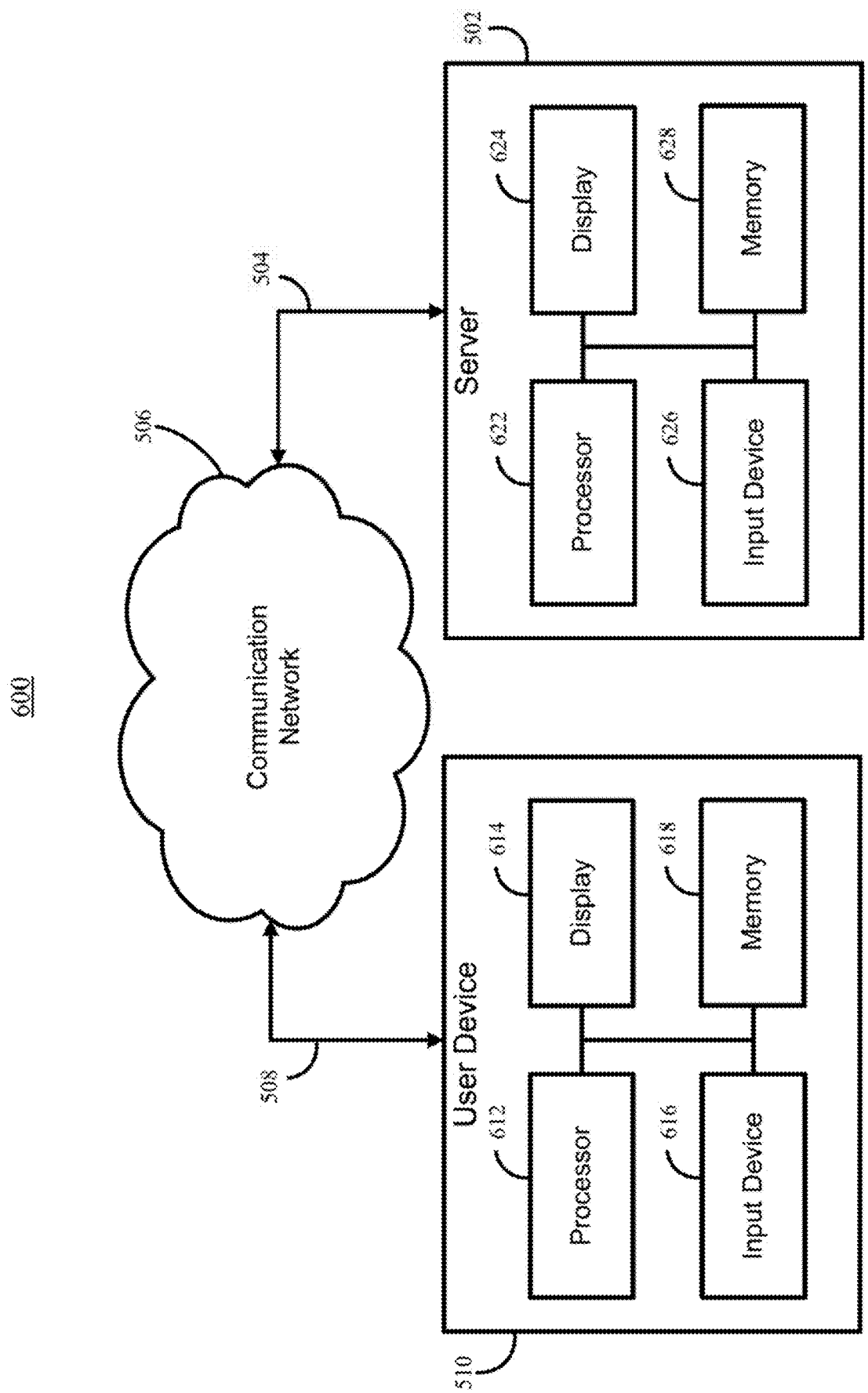
FIG. 6 shows a detailed example of the server and one of the content display devices of FIG. 5 that can be used in accordance with some implementations of the disclosed subject matter.

FIG. 6 illustrates an example 600 of hardware that can be used to implement server 502 and one of content display devices 510 depicted in FIG. 5 in accordance with some implementations. Referring to FIG. 6, content display device 510 can include a hardware processor 612, a display 614, an input device 616, and memory 618, which can be interconnected. In some implementations, memory 618 can include a storage device (such as a computer-readable medium) for storing a computer program for controlling hardware processor 612.

Hardware processor 612 can use the computer program to present on display 614 content and/or an interface that allows a user to interact with the mechanisms described herein for displaying information related to displayed content in response to detecting user attention and to send and receive data through communications link 508. It should also be noted that data received through communications link 508 or any other communications links can be received from any suitable source. In some implementations, hardware processor 612 can send and receive data through communication link 508 or any other communication links using, for example, a transmitter, receiver, transmitter/receiver, transceiver, or any other suitable communication device. Input device 616 can be a camera, a microphone, a remote control, a computer keyboard, a cursor-controller, dial, switchbank, lever, touchscreen, or any other suitable input device.

Server 502 can include hardware processor 622, display 624, input device 626, and memory 628, which can be interconnected. In some implementations, memory 628 can include a storage device for storing data received through communications link 504 or through other links, and can also receive commands and values transmitted by one or more users. The storage device can further include a server program for controlling hardware processor 622.

The mechanisms described herein for displaying information related to displayed content in response to detection of user attention can be implemented in content display devices 510 as software, firmware, hardware, or any suitable combination thereof.

In some implementations, server 502 can be implemented in one server or can be distributed as any suitable number of servers. For example, multiple servers 502 can be implemented in various locations to increase reliability and/or increase the speed at which the server can communicate with content display devices.

In one particular implementation, the content display application can include client-side software, hardware, or both. For example, the application can encompass a computer program written in a programming language recognizable by the content display device executing the application (e.g., a program written in a programming language, such as, Java, C, Objective-C, C++, C #, Javascript, Visual Basic, ColdFusion, or any other suitable approaches).

Figure 7:
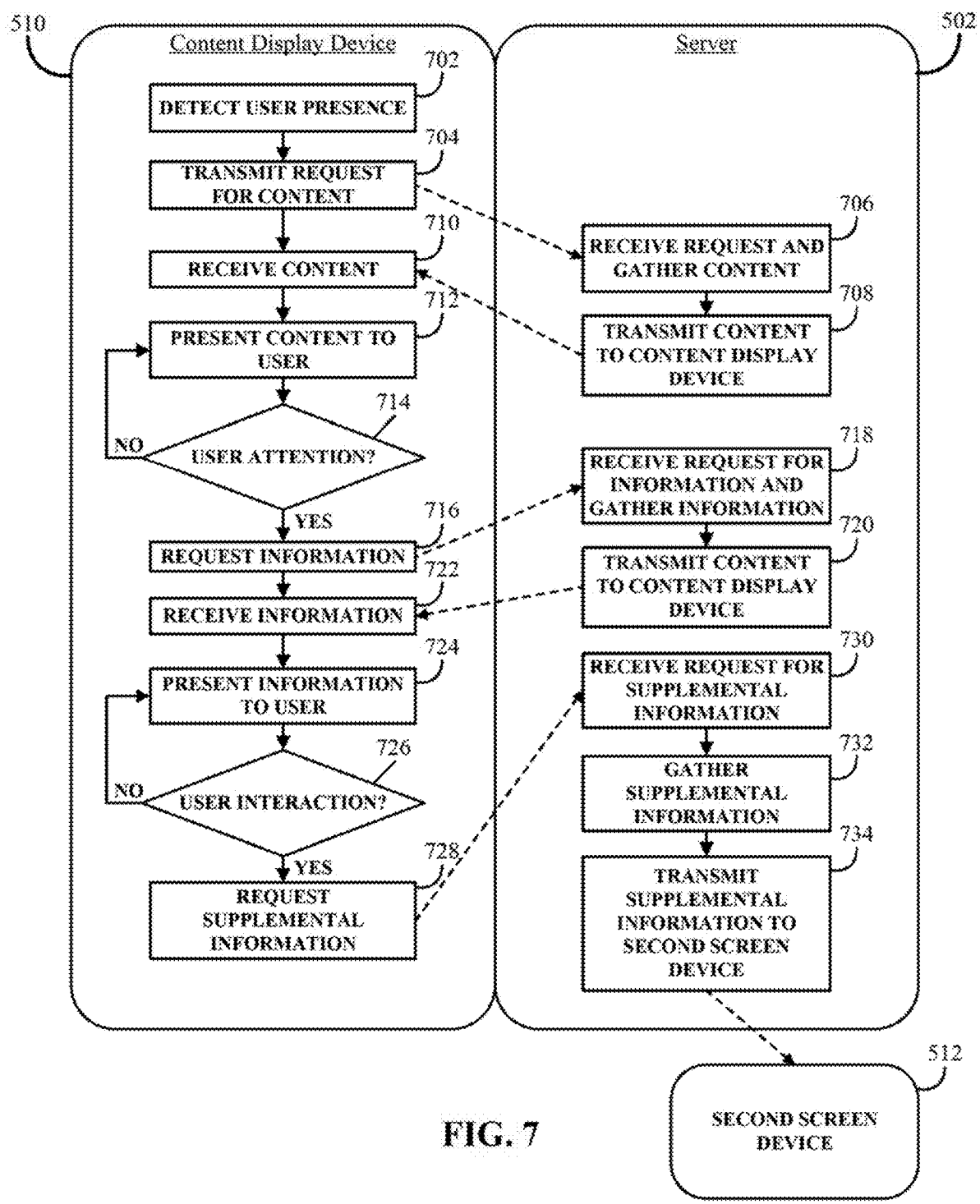
FIG. 7 shows a diagram illustrating an example of a data flow used in processes of FIGS. 1-3 in accordance with some implementations of the disclosed subject matter.

In some implementations, content display device 510 executing the content display application can communicate with server 502 to retrieve content and related information from server 502, and to provide supplemental content to a second screen device as shown in example 700 shown in FIG. 7. At 702, content display device 510 can detect a user presence. This can be done using any suitable techniques, such as the techniques described above in connection with FIGS. 1, 2 and 4. For example, the presence of a second screen device 512 on a network can be detected, a motion detector can detect the presence of a user by sensing motion, etc.

At 704, content display device 510 can transmit a request for content to server 502. In some implementations, content display device 510 can request content each time a user presence is detected at 702. Alternatively, content display device 510 can determine if content is stored in memory 618 and can determine when such content was received from server 502. If content display device 510 determines that the content was received more than a predetermined time (e.g., 24 hours, one week, etc.) prior to a current time, content display device 510 can request new and/or updated content at 704. Otherwise, if the content was received less than a predetermined time prior to the current time, content display device 510 can move to 712 without requesting and receiving content.

At 706, server 502 can receive the request for content and can gather content and associated content metadata in response to the request. As described herein, the content can include images, video, advertisements, etc. Additionally or alternatively, the particular content gathered can be based on past user behavior and/or user preferences. At 708, server 502 can transmit the content and associated content metadata gathered at 706 to content display device 510.

Content display device 510 can receive the content and associated content metadata at 710. At 712, the content can be presented to the user by content display device 510 in accordance with implementations described in connection with FIGS. 1 and 4. For example, a slideshow of popular and/or beautiful images can be presented.

At 714, the content display application can determine if the user has performed an action indicative of user attention, such as, turning to face the display. If user attention is detected ("YES" at 714), content display device 510 can request related information at 716 where the related information is related to the content that is presented at 712 when user attention is detected. Otherwise, if user attention is not detected ("NO" at 714), content display device 510 can continue to present content at 712.

At 716, content display device 510 can request the related information from the server 502, and server 502 can receive the request and gather related information at 718, and transmit the related information to content display device 510 at 720. The related information can be received by content display device 510 at 722 and the content display device can present the related information to the user at 724. In some implementations, related information can be received along with content at 710. In such implementations, the actions taken for requesting and receiving related information at 716 to 722 can be omitted.

At 726, the content display application can determine if a user interacts with the related information. If the user does not interact with the related information ("NO" at 726), the content display application can return to 724 and can continue to present related information. Note that the actions of presenting related information and detecting user interaction can be performed so long as the user continues to show attention to the presented content. If the user discontinues showing interest, the content display application can return to 712 and can continue to present the content received at 710.

Otherwise, if the user interacts with the related information ("YES" at 726), the content display device can request supplemental information from server 502 at 728. Server 502 can receive the request for supplemental information at 730, gather the supplemental information at 732, and transmit the supplemental information at 734. In some implementations, the supplemental information can be transmitted to second screen device 512 associated with the user that was detected at 702. The user can then view and/or interact with the supplemental information using second screen device 512.

In some implementations in accordance with the example of FIG. 7, server 502 can be implemented to periodically gather and store content from various sources, related information and supplemental content such that the information is readily available for transmission to content display device 510. In such implementations, the content can be associated with particular related information and/or supplemental content in a database. The content can also be categorized according to interests such that personalized content can be delivered to each user. In some implementations, the content can include user generated content, such as images captured by the user and stored in memory 618, or in a memory (e.g., memory in a personal computer, network attached storage, cloud storage, etc.) connected to content display device 510 through communication network 506.

Figure 8:
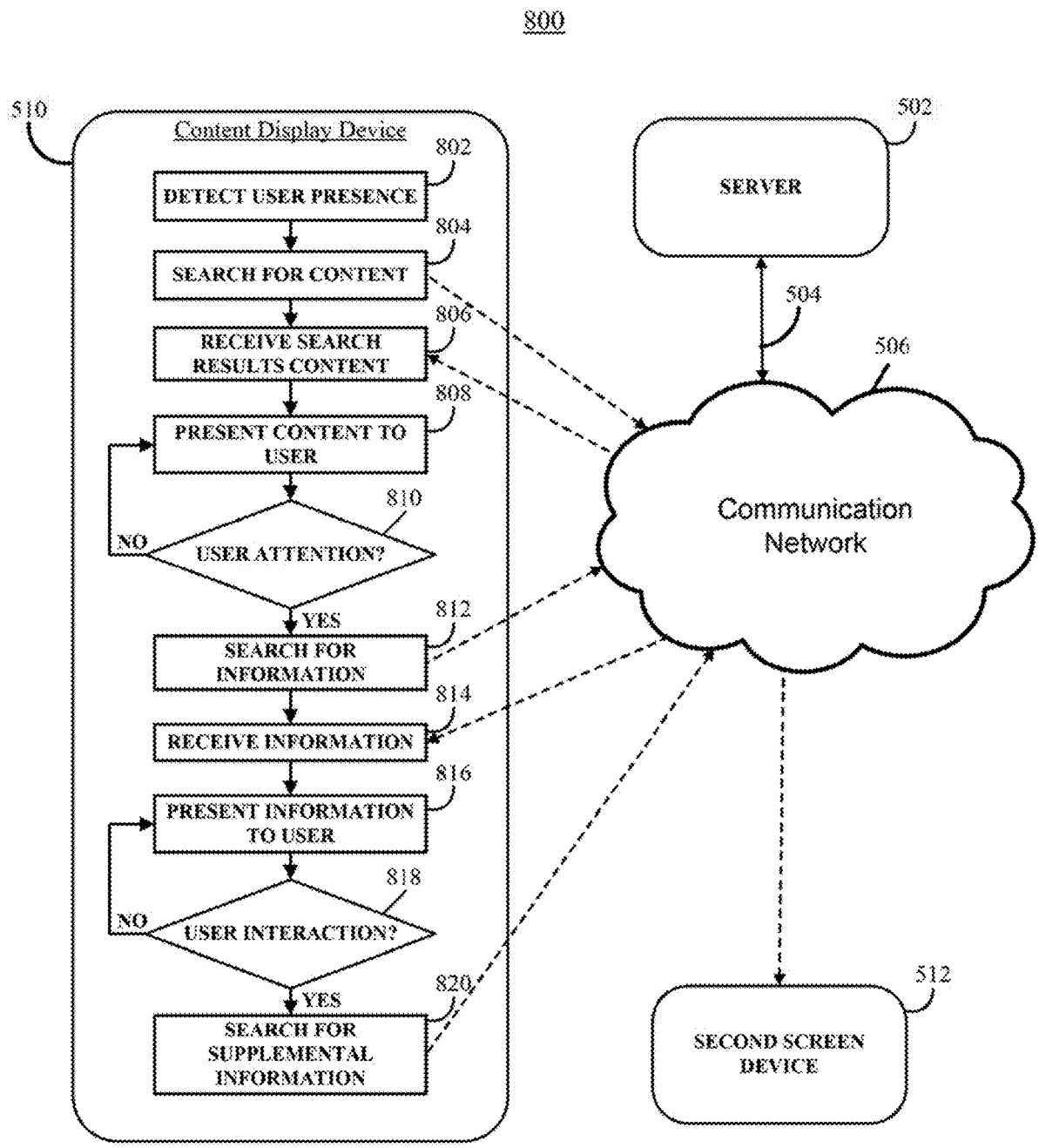
FIG. 8 shows another diagram illustrating an example of a data flow used in processes of FIGS. 1-3 in accordance with some implementations of the disclosed subject matter.

FIG. 8 shows an example 800 that is similar to example 700 but the content is searched for by content display device 510. At 802, content display device 510 can detect a user presence in a similar manner to 702 of the example of FIG. 7. At 804, the content display device can search for content to present to the user. The content display device can search user-generated content (such as images taken by the user) stored in memory 618 of content display device 510, as well as search for sources of content from other sources, such as, content sources accessible on the Internet. For example, the content display device can use a search application programming interface (API) to search various content sources for content that is suitable for the particular user detected at 802.

Content display device 510 can receive content at 806 that was returned as a result of the search performed at 804. Content display device 510 can choose content to store for presentation using any suitable techniques, such as: selecting the most popular search results; selecting the most relevant search results; etc. The resultant content can be downloaded to content display device 510 from server 502 when a search is performed and/or after content display device 510 chooses which content to store.

At 808, content can be presented to the user and user attention can be detected at 810. At 812, if user attention is detected, content display device can perform a search for information related to the content displayed at 808 when user attention was detected at 808. The search for information related to the content can be based on content metadata, user preferences and/or user behavior.

At 814 one or more items of related information can be received and content display device can determine which item to present to the user at 816. This can be determined based on any suitable parameters. If the user interacts with the related information ("YES" at 818), the content display device can search for supplemental information at 820 (e.g., using a search engine) and selected supplemental information can be transmitted to a second screen device 512 associated with the user.

Accordingly, methods, systems, and media for displaying information related to displayed content in response to detection of user attention are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-4, 7 and 8 can be executed or performed in any order or sequence not limited to the order and sequence shown and described in the figures. Also, some of the above steps of the processes of FIGS. 1-4, 7 and 8 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for presenting information to a user, the method comprising:
   in response to detecting a presence of the user, presenting consecutive content items that include a first content item followed by a second content item to be presented to the user, wherein the first content item is presented to the user during a first time period;
   in response to determining that user attention to the first content item has not been detected during the first time period, presenting the second content item from the consecutive content items to the user during a second time period; and
   in response to determining that the user attention to the second content item has been detected during the second time period, determining supplemental content related to the second content item based on one or more keywords from second content metadata associated with the second content item, pausing the presentation of the consecutive content items, and presenting the supplemental content to the user concurrently with the second content item.

2. The method of claim 1, further comprising retrieving the first content item and associated first content metadata, the second content item, and the second content metadata associated with the second content item.

3. The method of claim 1, wherein the supplemental content is presented on a display device.

4. The method of claim 1, further comprises transmitting the supplemental content for presentation on a second device, wherein the second device is associated over a communication network with a display device on which the consecutive content items are presented.

5. The method of claim 1, wherein determining that the user attention to the second content item during the second time period has been detected further comprises determining that user actions indicative of the user attention have been maintained over a specified period of time.

6. The method of claim 1, wherein determining the user attention to the first content item and the second content item further comprises detecting at least a first angle of a body part of the user with respect to a display device and detecting the user attention to one of the first content item and the second content item based on the first angle of the body part of the user.

7. The method of claim 6, wherein detecting the first angle of the body part of the user with respect to the display device further comprises detecting that a face angle of the user is within a predetermined angle of the display device.

8. The method of claim 1, wherein determining the user attention to the first content item and the second content item further comprises detecting a movement of a body part of the user with respect to a display device to a second angle and detecting the user attention to one of the first content item and the second content item based on the movement of the body part of the user to the second angle.

9. The method of claim 8, further comprising:
   detecting a second movement of the body part of the user with respect to the display device in response to the supplemental content being presented to the user;
   retrieving second supplemental content related to the supplemental content being presented to the user; and
   presenting the second supplemental content to the user in response to detecting the second movement.

10. The method of claim 9, wherein retrieving the second supplemental content further comprises:
    transmitting a search query for the second supplemental content based on the supplemental content being presented to the user;
    ranking search results responsive to the search query based on the supplemental content being presented to the user; and
    selecting at least one search result from the search results to be provided to the user based on the ranking.

11. The method of claim 1, wherein the supplemental content includes popular information related to the second content item based on one or more keywords from the second content metadata.

12. A system for presenting information to a user, the system comprising:
    a hardware processor configured to:
       in response to detecting a presence of the user, present consecutive content items that include a first content item followed by a second content item to be presented to the user, wherein the first content item is presented to the user during a first time period;
       in response to determining that user attention to the first content item has not been detected during the first time period, present the second content item from the consecutive content items to the user during a second time period; and
       in response to determining that the user attention to the second content item has been detected during the second time period, determine supplemental content related to the second content item based on one or more keywords from second content metadata associated with the second content item, pause the presentation of the consecutive content items, and present the supplemental content to the user concurrently with the second content item.

13. The system of claim 12, wherein the hardware processor is further configured to retrieve the first content item and associated first content metadata, the second content item, and the second content metadata associated with the second content item.

14. The system of claim 12, wherein the supplemental content is presented on a display device.

15. The system of claim 12, wherein the hardware processor is further configured to transmit the supplemental content for presentation on a second device, wherein the second device is associated over a communication network with a display device on which the consecutive content items are presented.

16. The system of claim 12, wherein determining that the user attention to the second content item during the second time period has been detected further comprises determining that user actions indicative of the user attention have been maintained over a specified period of time.

17. The system of claim 12, wherein determining the user attention to the first content item and the second content item further comprises detecting at least a first angle of a body part of the user with respect to a display device and detecting the user attention to one of the first content item and the second content item based on the first angle of the body part of the user.

18. The system of claim 17, wherein detecting the first angle of the body part of the user with respect to the display device further comprises detecting that a face angle of the user is within a predetermined angle of the display device.

19. The system of claim 12, wherein determining the user attention to the first content item and the second content item further comprises detecting a movement of a body part of the user with respect to a display device to a second angle and detecting the user attention to one of the first content item and the second content item based on the movement of the body part of the user to the second angle.

20. The system of claim 19, wherein the hardware processor is further configured to:
   detect a second movement of the body part of the user with respect to the display device in response to the supplemental content being presented to the user;
   retrieve second supplemental content related to the supplemental content being presented to the user; and
   present the second supplemental content to the user in response to detecting the second movement.

21. The system of claim 20, wherein retrieving the second supplemental content further comprises:
   transmitting a search query for the second supplemental content based on the supplemental content being presented to the user;
   ranking search results responsive to the search query based on the supplemental content being presented to the user; and
   selecting at least one search result from the search results to be provided to the user based on the ranking.

22. The system of claim 12, wherein the supplemental content includes popular information related to the second content item based on one or more keywords from the second content metadata.

23. A non-transitory computer-readable medium containing computer executable instructions that, when executed by a processor, cause the processor to perform a method for presenting information to a user, the method comprising:
   in response to detecting a presence of the user, presenting consecutive content items that include a first content item followed by a second content item to be presented to the user, wherein the first content item is presented to the user during a first time period;
   in response to determining that user attention to the first content item has not been detected during the first time period, presenting the second content item from the consecutive content items to the user during a second time period; and
   in response to determining that the user attention to the second content item has been detected during the second time period, determining supplemental content related to the second content item based on one or more keywords from second content metadata associated with the second content item, pausing the presentation of the consecutive content items, and presenting the supplemental content to the user concurrently with the second content item.

* * * * *